No. 709,094. Patented Sept. 16, 1902.
H. R. HOWE.
PROCESS OF DEODORIZING MILK OR CREAM.
(Application filed Jan. 25, 1902.)
(No Model.) 2 Sheets—Sheet 1.
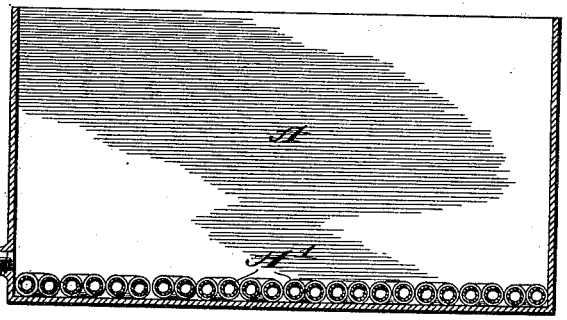
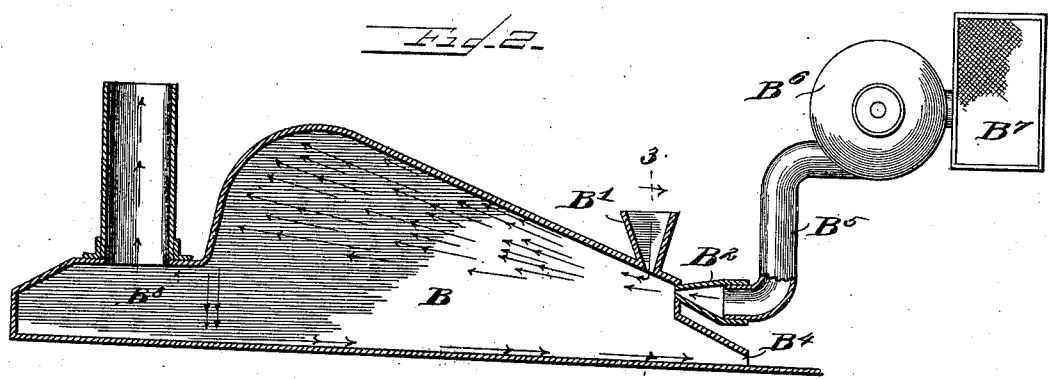
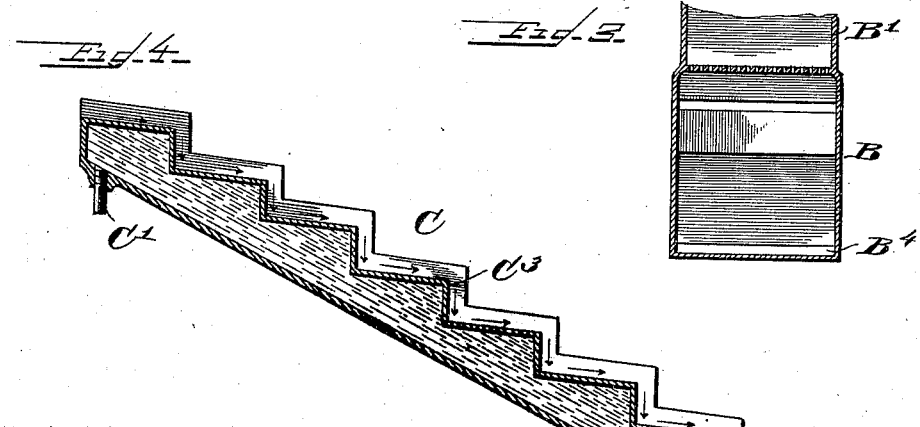

No. 709,094. Patented Sept. 16, 1902.
H. R. HOWE.
PROCESS OF DEODORIZING MILK OR CREAM.
(Application filed Jan. 25, 1902.)
(No Model.) 2 Sheets—Sheet 2.
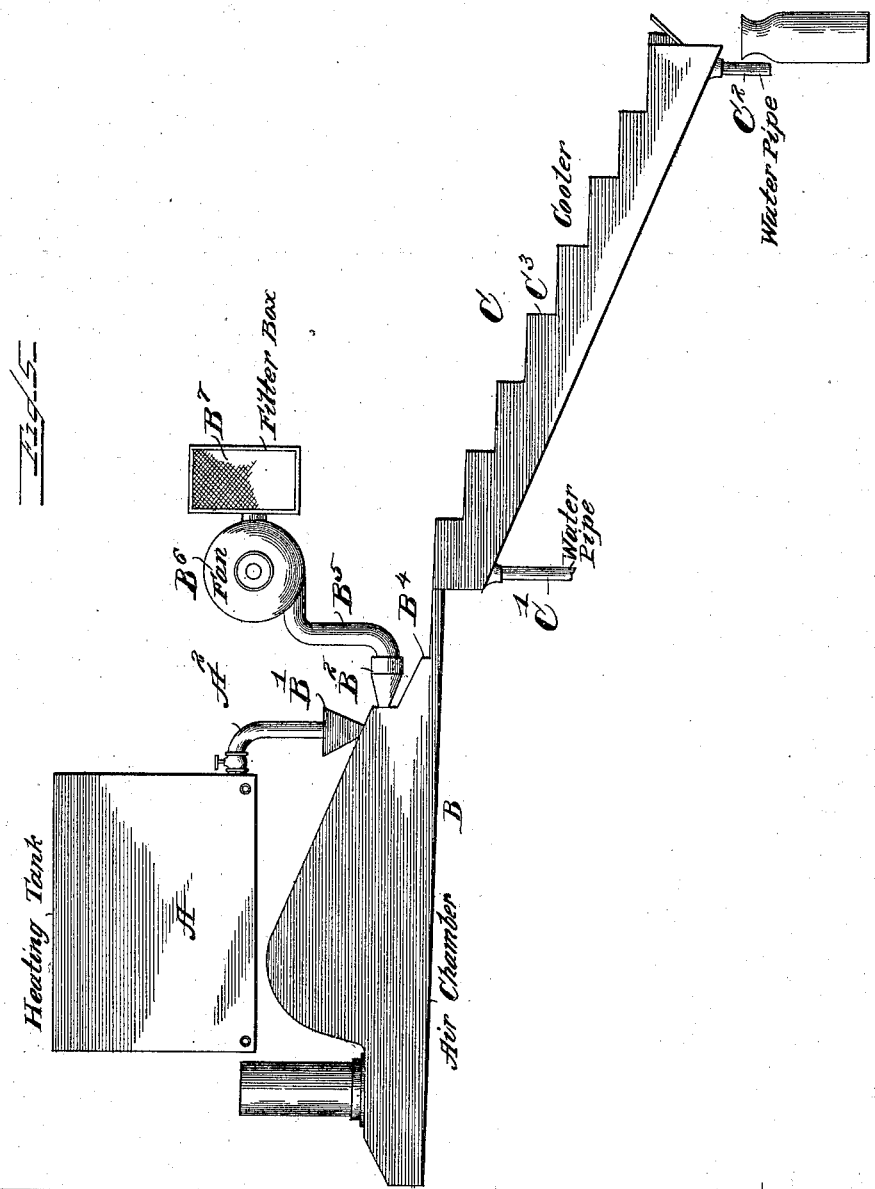

UNITED STATES PATENT OFFICE.

HENRY R. HOWE, OF ROCKFORD, ILLINOIS, ASSIGNOR OF ONE-HALF TO HENRY W. CARMICHAEL, OF ROCKFORD, ILLINOIS.

PROCESS OF DEODORIZING MILK OR CREAM.

SPECIFICATION forming part of Letters Patent No. 709,094, dated September 16, 1902.

Application filed January 25, 1902. Serial No. 91,197. (No specimens.)

*To all whom it may concern:*

Be it known that I, HENRY R. HOWE, a citizen of the United States, residing at Rockford, in the county of Winnebago and State of Illinois, have invented an Improved Process of Deodorizing Milk or Cream, of which the following is a specification.

The milk and cream used in creameries and that collected for shipment to the larger cities is commonly a mixture of the product of private dairies. As is well known, milk readily absorbs odors and in other ways easily becomes tainted, and a small quantity of tainted milk mixed with a large quantity of pure milk will contaminate the whole. In order to keep milk sweet and free from odors, absolute cleanliness is required in its handling, and this all dairymen are not able and some, perhaps, are not disposed to provide. Care in the selection of cleanly dairies and vigilant attention to the quality of the milk which they produce have been the only safeguards that could be exercised by the purchaser of large quantities of milk against obtaining tainted milk, the purification of milk already contaminated except by the application of heat to partially cook it never having been successfully practiced, so far as I am aware.

The object of this invention is to deodorize milk and cream without subjecting it to any considerable degree of heat, thus obviating the "cooked" flavor that is imparted to milk by raising it to a temperature of about 180° Fahrenheit or higher.

Odors from milk or cream are caused by foreign matter falling into it and becoming dissolved therein, by unclean utensils, and by its exposure to impure air and gases. I have found that raising the temperature of the liquid in a moderate degree tends to free these gases, and when said gases are thus made more volatile that the subjection of the liquid to a forcible disintegrating or atomizing process, at the same time violently agitating its atoms in pure air, tends to liberate said gases and to separate them from the liquid.

In the accompanying drawings, Figure 1 is a vertical section through a heating-tank for raising the temperature of the milk or cream. Fig. 2 is a view, partly in section, of an apparatus for disintegrating milk or cream and subjecting it in its divided condition to a strong blast of pure air, also for collecting the milk or cream after the same has condensed or gathered together again. Fig. 3 is a transverse vertical section on dotted line 3 3 of Fig. 2. Fig. 4 is a longitudinal vertical section illustrating a means for reducing the temperature of the milk or cream to the desired degree. Fig. 5 is a diagrammatic view showing an arrangement of the apparatus herein described and employed in carrying out my process.

In the construction of apparatus for the performance of my invention I provide a warming-tank A, having near its bottom suitable steam-coils A', also having a faucet $A^2$ for drawing the warm milk from the tank. I further provide an inclosed air drum or chamber B, having near its forward end in its upper walls a funnel B', the interior of which funnel communicates with the interior of said drum by means of perforations of small gage or diameter to admit liquid from the funnel to the interior of the air-drum B. Directly in front of the opening of said funnel into said drum I provide an air-funnel $B^2$, also communicating with the interior of the drum and having a conformation adapted to cause an air-current passing through said funnel to be projected rearward through the drum and slightly upward, substantially at right angles to the liquid-funnel B'. Near the rear end of the drum I provide an air-escape opening $B^3$, and at the forward end a liquid-escape opening $B^4$. The air-funnel $B^2$ is provided with a pipe $B^5$ for conducting air under pressure from the rotary fan $B^6$, and said fan is supplied with pure air from the filter-box $B^7$.

Though strictly it is not a part of the apparatus necessary to perform the process herein described, I provide the cooler C, having the inlet-opening C' for cool water and the outlet-opening $C^2$ for the water after it has absorbed heat from the milk or cream, which latter is intended to pass by gravity over the face $C^3$ of said cooler.

For convenience the apparatus may be so arranged and located that the faucet $A^2$ discharges the warm milk or cream from the tank A into the funnel B' of the air-drum B, and said air drum discharges the milk or cream at the upper end of the cooler C.

In performing my said process I place a quantity of milk or cream within the tank A, raising the temperature of the liquid to a point between 100° and 155° Fahrenheit, preferably between 135° and 140° Fahrenheit. I then discharge said milk or cream through the faucet $A^2$ into the funnel $B'$ of the air-drum. The shaft of the blower $B^5$ is caused to revolve at a high rate of speed, producing a strong current of air blowing into the air-drum substantially at right angles to the line upon which the milk or cream by gravity alone would enter said drum from the funnel $B'$. As soon as liquid is placed in said funnel it enters the air-drum B and is immediately caught by the strong air-blast coming from the air-funnel $B^2$, is disintegrated, and thrown violently against a curved wall at the opposite side of the air-drum. The atomized liquid collects against the side of said drum and is here further subjected to said air-blast, said liquid finally dropping to the bottom of the air-drum B and escaping through the opening $B^4$ at the forward end of said drum. From the drum B the milk or cream passes to the cooler C, over which it slowly runs until at its lower end it is collected, purified, cooled, and ready for shipment. If after cream has been purified by my process it is desired to churn it, it may be collected as it passes from the air-drum B and before it goes to the cooler C.

I claim as my invention—

1. The process of deodorizing milk or cream, consisting in heating said milk or cream to a temperature ranging from 100° to 155° Fahrenheit, and disintegrating said milk or cream by means of a blast of pure air.

2. The process of deodorizing milk or cream, consisting in heating said milk or cream to a temperature ranging from 135° to 140° Fahrenheit, and disintegrating said milk or cream by means of a blast of pure air.

HENRY R. HOWE.

Witnesses:
JOHN FITZSIMMONS,
L. C. CARMICHAEL.